United States Patent
King et al.

(10) Patent No.: US 9,336,111 B1
(45) Date of Patent: May 10, 2016

(54) SYSTEM AND METHOD FOR DATA LOGGING WITHIN A FIELD REPLACEABLE UNIT

(75) Inventors: Joseph P. King, Sterling, MA (US); Phil Roux, Sutton, MA (US); Mingxiang Xu, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 293 days.

(21) Appl. No.: 12/847,559

(22) Filed: Jul. 30, 2010

(51) Int. Cl.
*G06F 11/30* (2006.01)
*G06F 11/07* (2006.01)

(52) U.S. Cl.
CPC ........ *G06F 11/3003* (2013.01); *G06F 11/0766* (2013.01); *G06F 11/0778* (2013.01); *G06F 11/30* (2013.01); *G06F 11/3055* (2013.01); *G06F 11/3058* (2013.01); *G06F 11/3065* (2013.01); *G06F 11/3089* (2013.01)

(58) Field of Classification Search
CPC ............ G06F 11/0766; G06F 11/0778; G06F 11/0787; G06F 11/30; G06F 11/3003; G06F 11/355; G06F 11/3058; G06F 11/3065; G06F 11/3089
See application file for complete search history.

(56) References Cited

U.S. PATENT DOCUMENTS

| | | | | |
|---|---|---|---|---|
| 6,154,728 | A * | 11/2000 | Sattar et al. | 705/28 |
| 6,519,552 | B1 * | 2/2003 | Sampath | G02B 23/0254 702/183 |
| 6,909,992 | B2 * | 6/2005 | Ashley | 702/184 |
| 7,321,892 | B2 * | 1/2008 | Vadon et al. | 707/767 |
| 2002/0138235 | A1 * | 9/2002 | Edwards | G06F 11/0748 702/184 |
| 2003/0216881 | A1 * | 11/2003 | Weiss | G06Q 30/02 702/130 |
| 2003/0217043 | A1 * | 11/2003 | Weiss | G06F 17/30896 |
| 2003/0217247 | A1 * | 11/2003 | Abramovitz | G06F 11/006 711/173 |
| 2003/0236998 | A1 * | 12/2003 | Gilstrap | G06F 21/73 726/34 |
| 2004/0078634 | A1 * | 4/2004 | Gilstrap et al. | 714/5 |
| 2004/0210800 | A1 * | 10/2004 | Ghislain Gabriel Vecoven | G06F 11/0712 714/4.2 |
| 2004/0221198 | A1 * | 11/2004 | Vecoven | 714/25 |
| 2005/0273183 | A1 * | 12/2005 | Curt et al. | 700/22 |
| 2006/0212752 | A1 * | 9/2006 | Mechalke | G06F 11/0727 714/47.3 |
| 2007/0103324 | A1 * | 5/2007 | Kosuge et al. | 340/618 |
| 2008/0004768 | A1 * | 1/2008 | Chang et al. | 701/36 |
| 2009/0240462 | A1 * | 9/2009 | Lee | 702/141 |
| 2011/0077865 | A1 * | 3/2011 | Chen et al. | 702/3 |
| 2011/0154091 | A1 * | 6/2011 | Walton et al. | 714/2 |

FOREIGN PATENT DOCUMENTS

EP 2 031 800 A1 * 3/2009 ............... H04L 12/24

OTHER PUBLICATIONS

"Storing Data with PHP—Flat File or Database?", Dec. 1, 2008, Wiley Publishing, Inc. Retrieved on Oct. 15, 2012 from <http://web.archive.org/web/20081201055341/http://www.dummies.com/how-to/content/storing-data-with-php-flat-file-or-database.html>.*

* cited by examiner

*Primary Examiner* — Arpan P. Savla
(74) *Attorney, Agent, or Firm* — Brian J. Colandreo; Mark H. Whittenberger; Holland & Knight LLP

(57) ABSTRACT

A computer-implemented method, computer program product, and computing system for detecting the availability of status-related data within a field replaceable unit (FRU). The status-related data is written to persistent memory within the FRU.

24 Claims, 3 Drawing Sheets

SYSTEM AND METHOD FOR DATA LOGGING WITHIN A FIELD REPLACEABLE UNIT

TECHNICAL FIELD

This disclosure relates to data logging and, more particularly, to data logging in a logical chronological fashion.

BACKGROUND

Computing system often employ field replaceable units (FRUs) that incorporate various key components of a computing system. A field replaceable unit is a generic term used to describe any hardware device (or more commonly a part or component of a device or system) that easily can be replaced by a skilled technician without having to send the entire device or system in for repair.

For example, storage processors, fan systems, battery assemblies, link controllers, and power supplies may be configured as and incorporated within field replaceable units. Accordingly, in the event of a failure of one of these devices, the failed device can be quickly swapped out with a functioning device (often without the use of any tools). Accordingly, the use of FRUs in high-availability computing environments offers substantial benefits.

Unfortunately, when an FRU fails, the source of the failure is often unknown and the FRU offers little evidence of the same; often providing little more information that an illuminated "failure" LED. Further complicating the issue is that when a failure is transient in nature (e.g., a temporary low voltage condition), when the failed FRU is serviced and diagnostics are performed, the source of the failure may often be undetectable.

SUMMARY OF DISCLOSURE

In a first implementation, a computer-implemented method includes detecting the availability of status-related data within an FRU. The status-related data is written to persistent memory within the FRU.

One or more of the following features may be included. The status-related data may include fault data that was generated due to the occurrence of a fault condition within the FRU. The status-related data may include diagnostic data that was generated due to diagnostic operations performed within the FRU. The status-related data may include housekeeping data that was generated due to housekeeping operations performed within the FRU. The status-related data may include one or more of: a time stamp and a date stamp.

The persistent memory may be chosen from the group consisting of EEPROMs, Flash ROMs, battery backed up volatile memory, and disk drives. The status-related data may be stored within a database file resident on the FRU. The status-related data may be stored within a flat file resident on the FRU. The status-related data may be stored as a logical chronological log file resident on the FRU.

In another implementation of this disclosure, a computer program product resides on a computer readable medium and has a plurality of instructions stored on it. When executed by a processor, the instructions cause the processor to perform operations including detecting the availability of status-related data within an FRU. The status-related data is written to persistent memory within the FRU.

One or more of the following features may be included. The status-related data may include fault data that was generated due to the occurrence of a fault condition within the FRU. The status-related data may include diagnostic data that was generated due to diagnostic operations performed within the FRU. The status-related data may include housekeeping data that was generated due to housekeeping operations performed within the FRU. The status-related data may include one or more of: a time stamp and a date stamp.

The persistent memory may be chosen from the group consisting of EEPROMs, Flash ROMs, battery backed up volatile memory, and disk drives. The status-related data may be stored within a database file resident on the FRU. The status-related data may be stored within a flat file resident on the FRU. The status-related data may be stored as a logical chronological log file resident on the FRU.

In another implementation, a computing system includes at least one processor and at least one memory architecture coupled with the at least one processor. A first software module is executed on the at least one processor and the at least one memory architecture. The first software module is configured to perform operations including detecting the availability of status-related data within an FRU. A second software module is executed on the at least one processor and the at least one memory architecture. The second software module is configured to perform operations including writing the status-related data to persistent memory within the FRU.

One or more of the following features may be included. The status-related data may include fault data that was generated due to the occurrence of a fault condition within the FRU. The status-related data may include diagnostic data that was generated due to diagnostic operations performed within the FRU. The status-related data may include housekeeping data that was generated due to housekeeping operations performed within the FRU. The status-related data may include one or more of: a time stamp and a date stamp.

The persistent memory may be chosen from the group consisting of EEPROMs, Flash ROMs, battery backed up volatile memory, and disk drives. The status-related data may be stored within a database file resident on the FRU. The status-related data may be stored within a flat file resident on the FRU. The status-related data may be stored as a logical chronological log file resident on the FRU.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
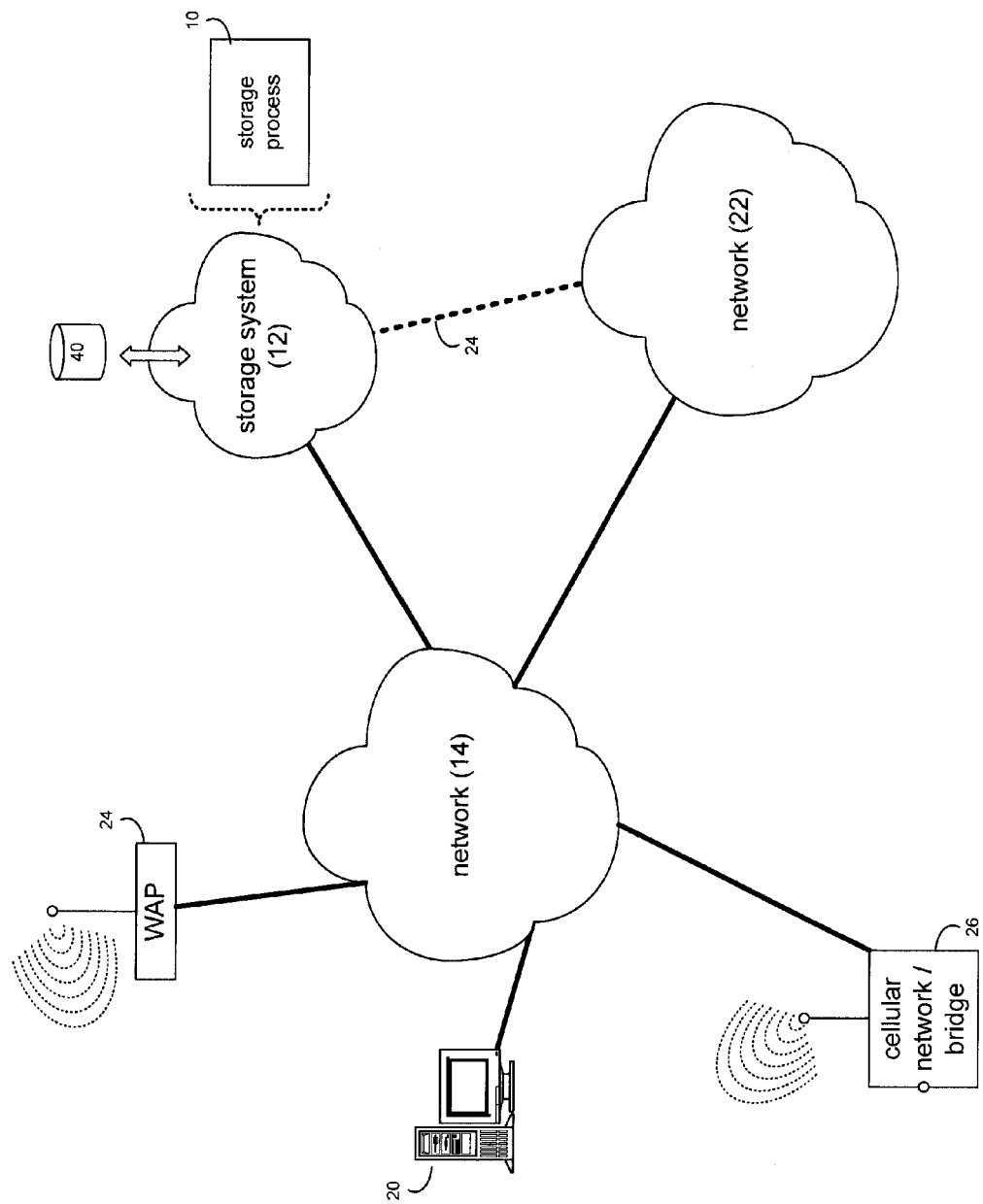
FIG. 1 is a diagrammatic view of a data storage process executed in whole or in part by a storage system coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
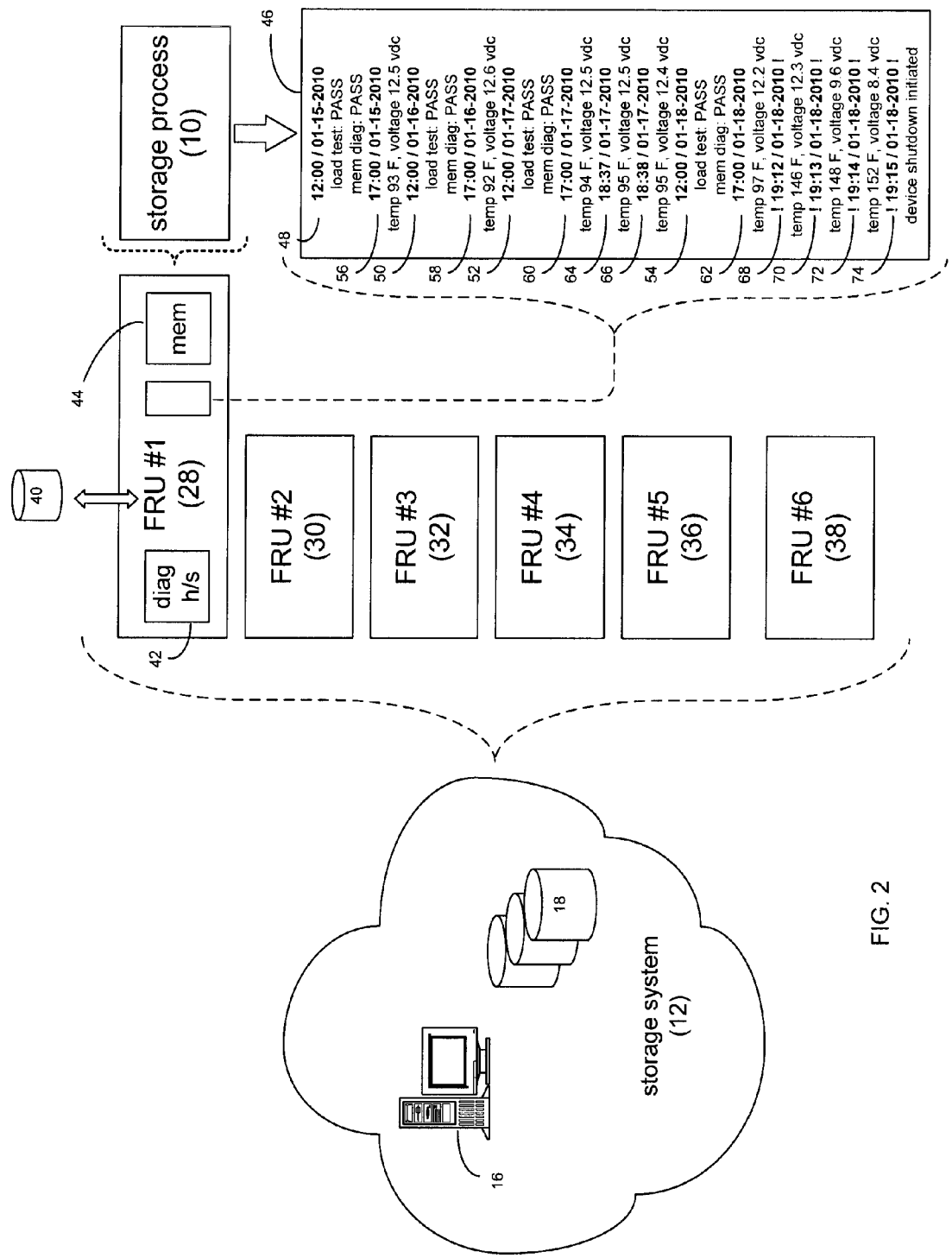
FIG. 2 is a diagrammatic view of the storage system of FIG. 1.

Referring to FIGS. 1 & 2, there is shown data storage process 10. Data storage process 10 may reside on and may be executed by storage system 12, which may be connected to network 14 (e.g., the Internet or a local area network). Examples of storage system 12 may include, but are not limited to: a storage array, a network attached storage device, a computing cloud and stand-alone storage modules.

Storage system 12 may include one or more computing devices (e.g., server computer 16) and one or more storage devices (e.g., storage device 18). Examples of the computing devices that may be included within storage system 12 may include but are not limited to: a personal computer, a server computer, a series of server computers, a mini computer, a mainframe computer, and dedicated storage hardware. Examples of the storage devices that may be included within storage system 12 may include but are not limited to: hard disk drives; tape drives; optical drives; RAID arrays; random access memory systems; read-only memory systems, and flash-based memory systems.

One or more of the computing devices that may be included within storage system 12 may execute a network operating system, examples of which may include but are not limited to: Microsoft Windows XP Server™; Novell Netware™; and Redhat Linux™ that may allow client devices (e.g., client computer 20) to access data stored within storage system 12 (e.g., on storage device 18).

One or more of the computing devices that may be included within storage system 12 may execute a web server application, examples of which may include but are not limited to: Microsoft IIS™, Novell Webserver™, or Apache Webserver™, which may allow for e.g., HTTP (i.e., HyperText Transfer Protocol) access to server computer 24 via network 14.

Network 14 may be connected to one or more secondary networks (e.g., network 22), examples of which may include but are not limited to: a local area network; a wide area network; or an intranet, for example. Storage system 12 may be coupled to network 22 via one or more links (e.g., link 24 shown in phantom).

While client computer 20 is shown hardwired to network 14, this is for illustrative purposes only and is not intended to be a limitation of this disclosure, as other configurations are possible and are considered to be within the scope of this disclosure. For example, client computer 20 may be wirelessly coupled to network 14 and/or network 22 using a wireless access point (e.g., WAP 24) and/or a cellular network (e.g., cellular/network bridge 26).

WAP 24 may be, for example, an IEEE 802.11a, 802.11b, 802.11g, Wi-Fi, and/or Bluetooth device that is capable of establishing a secure communication channel (not shown) between client computer 20 and WAP 24.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Cellular/network bridge 26 may be a GSM (i.e., Global System for Mobile Communications) device and/or a CDMA (i.e., Code Division multiple Access) that is capable of establishing a secure communication channel (not shown) between client computer 20 and cellular/network bridge 26.

One or more of the computing devices and/or storage devices included within storage system 10 may include one or more FRUs (e.g, FRU 28, FRU 30, FRU 32, FRU 34, FRU 36, FRU 38). As discussed above, an FRU is a generic term used to describe any hardware device (or more commonly a part or component of a device or system) that easily can be replaced by a skilled technician without having to send the entire device or system in for repair. Some examples of FRUs may include but are not limited to storage processor FRUs, fan system FRUs, battery assembly FRUs, link controller FRUs, and power supply FRUs.

Figure 3:
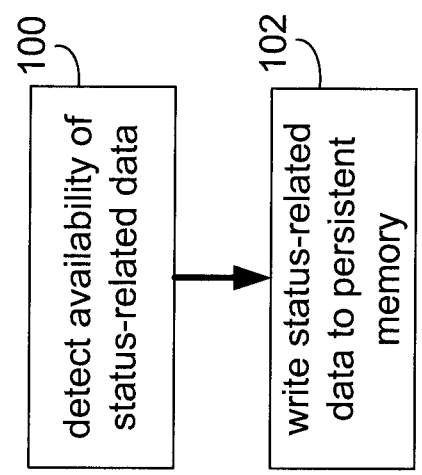
FIG. 3 is a flow chart of the storage process of FIG. 1.

Referring also to FIG. 3, storage process 10, may be configured to detect 100 the availability of status-related data within an FRU and write 102 status-related data to persistent memory within the FRU. Storage process 10 may be executed on one, some, or all of the FRUs included within storage system 12. For illustrative purposes only, the following example will illustrate storage process 10 being executed on FRU 28. However, it is understood that this is for illustrative purposes only and is not intended to be a limitation of this disclosure.

The instruction sets and subroutines of data storage process 10, which may be stored on storage device 40 coupled to FRU 28, may be executed by one or more processors (not shown) and one or more memory architectures (not shown) incorporated into FRU 40. Storage device 40 may include but is not limited to: a hard disk drive; a tape drive; an optical drive; a RAID array; a random access memory system; a read-only memory system, and a flash-based memory system.

FRU 28 may include internal diagnostic hardware/software (generically represented as diagnostics 42) that may be configured to routinely monitor various conditions (i.e., perform housekeeping operations) within FRU 28, thus generating housekeeping data. The conditions monitored may also include conditions external to FRU 28 that may lead to the failure of FRU 28 to perform properly. Examples of such external conditions may include but are not limited to abnormal environmental conditions (e.g., temperature/humidity) and abnormal input or output conditions with respect to FRU 28.

Example of such monitoring operations performed by diagnostics 42 may include but are not limited to: the internal temperature of FRU 28 may be monitored by diagnostics 42 via one or more temperature probes (not shown) included within FRU 28; the voltage and current levels at various locations within FRU may be monitored by diagnostics 42 via one or more voltage/curent probes (not shown) included within FRU 28; and the status of one of more components (e.g., a cooling fan) included within FRU 28 may be monitored by diagnostics 42 via e.g., one or more differential pressure sensors (not shown) or current sensors (not shown) included within FRU 28.

The rate at which the above-described housekeeping data is generated may vary depending on the mode of operation of FRU 28. For example, when in sleep mode, diagnostics 42 may generate housekeeping data at a comparatively low frequency. Accordingly, diagnostics 42 may be configured to wake FRU 28 from sleep mode once every 24 hours so that some or all of the above-described housekeeping data may be generated. Once generated, FRU 28 may return to sleep mode.

During normal operation, diagnostics 42 may generate housekeeping data at an enhanced frequency. Accordingly, diagnostics 42 may be configured so that some or all of the above-described housekeeping data may be generated once every few minutes.

Further, during times of heavy usage, diagnostics 42 may generate housekeeping data at a comparatively high frequency. Accordingly, diagnostics 42 may be configured so that some or all of the above-described housekeeping data may be generated once every few seconds.

Additionally, diagnostics 42 may be configured to routinely perform diagnostic operations within FRU 28, thus generating diagnostic data. Examples of such diagnostic operations may include but are not limited to: battery load tests, computational capability tests, memory diagnostic tests, communication port tests, and network/power connectivity test.

As with the above-described housekeeping data, the rate at which the above-described diagnostic data is generated may vary depending upon the mode of operation (e.g., sleep mode, normal operation mode, heavy usage mode, error recovery mode) of FRU 28.

Additionally, diagnostics 42 may be configured to make available fault data that may be generated within FRU 28 in the event of a fault condition within FRU 28. Examples of such fault conditions may include but are not limited to: a high temperature condition, a low temperature condition, a high current condition, a low current condition, a component failure condition, a communication failure condition, a failure of a diagnostic operation (e.g.: a failed battery load test, a failed computational capability test, a failed memory diagnostic test, a failed communication port test, and/or a failed network/power connectivity test).

As discussed above, storage process 10 may be configured to detect 100 the availability of status-related data within FRU 28. This status-related data may include but is not limited to: fault data that was generated due to the occurrence of a fault condition within FRU 28; diagnostic data that was generated due to diagnostic operations performed within FRU 28; and/or housekeeping data that was generated due to housekeeping operations performed within FRU 28. Accordingly, storage process 10 may be configured to detect 100 the availability of housekeeping data, diagnostic data and/or fault data within FRU 28.

In the event that such status-related data is available, storage process 10 may be configured to write 102 the status-related data to persistent memory (e.g., memory 44) within FRU 28. Examples of persistent memory 44 may include but are not limited to EEPROMs, Flash ROMs, battery backed up volatile memory, and disk drives, as well as other non-volatile storage devices that are capable of capturing data and conveying the data back at a later date and time for analysis or other purpose Storage process 10 may write 102 the status-related data to persistent memory 44 as data file 46 (e.g., a logical chronological log file) in one of many known files types, examples of which may include but are not limited to a database file (e.g., a SQL file, a MySQL file, an MS Access file, and MSSQL File or a PostgreSQL file) and a flat file. Data file 46 (and the status-related data included therein) may include a time stamp and/or a date stamp for diagnostic purposes.

Assume for illustrative purposes the FRU 28 fails and is replaced in the field by a service technician and subsequently returned to a service center for repair/replacement. As storage process 10 is configured to detect 100 the availability of status-related data within FRU 28 and write 102 this status-related data to data file 46 that is stored within persistent memory 44 included within FRU 28, a record of the operation of FRU 28 (i.e., data file 46) is available for scrutiny by the service technician charged with determining if FRU 28 should be repaired or replaced.

For example, data file 46 is shown to include four entries (entries 48, 50, 52, 54) corresponding to diagnostic data generated during e.g., sleep mode, as the time/date stamps indicates that data storage process 10 made these entries in data file 46 at twenty-four hour intervals. Entries 48, 50, 52, 54 appear to indicate the FRU 28 was functioning properly when these entries were made.

Further, data file 46 is shown to include four entries (entries 56, 58, 60, 62) corresponding to housekeeping data generated during e.g., sleep mode, as the time/date stamps indicates that data storage process 10 made these entries in data file 46 at twenty-four hour intervals. Entries 56, 58, 60, 62 appear to indicate the FRU 28 was functioning properly when these entries were made.

Data file 46 further includes two additional entries (entries 64, 66) corresponding to housekeeping data generated during e.g., normal operation of FRU 28, as the time/date stamps indicates that data storage process 10 made these entries in data file 46 at one minute intervals. Entries 64, 66 appear to indicate the FRU 28 was functioning properly when these entries were made.

However, data file 46 further includes four entries (entries 68, 70, 72, 74) that correspond to fault data that appears to provide insight concerning the pending and then subsequent failure of FRU 28. Specifically, entry 68 indicates the occurrence of a high temperature condition; entry 70 indicates the worsening of the high temperature condition and the occurrence of a low voltage condition; entry 72 indicates the further worsening of the high temperature condition and the worsening of the low voltage condition; and entry 74 indicates that FRU 28 shut itself down due to these fault conditions.

Accordingly, the service technician charged with determining if FRU 28 should be repaired or replaced may pay particular attention to entries 68, 70, 72. 74, as these entries may provide insight as to what initiated the failure (i.e, abnormal ambient temperature) of FRU 28.

FRU 28 generally (and storage process 10 specifically) may be configured to allow the above-referenced technician to easily access and analyze data file 46. For example, storage process 10 may be configured to include an HTTP engine that allows the above-referenced service technician to access data file 46 by entering an IP address into a standard web browser. Alternatively, storage process 10 may be configured to include a data dump utility that allows for the downloading of data file 46 to a computing device being utilized by the above-referenced technician.

Storage process 10 may be configured so that once fault data (e.g., any fault data or subsets of certain types of fault data) is detected 100 and written 102 to data file 46, the writing 102 of additional status-related data to data file 46 may be suspended immediately, after a certain quantity of additional write operations are performed on data file 46, or after a defined period of time. This functionality of storage process 10 may help preserve data file 46 in the event that data file 46 has a defined maximum size and is configured in a FIFO fashion in which older data is overwritten to make room for newer data.

Storage process 10 may further be configured so that storage process 10 collects and stores "run-time" data (i.e., the amount of time that FRU 28 has been running since it was last powered down) and "accumulated time" data (i.e., the total amount of time that FRU 28 has been running). Accordingly, storage process 10 may be configured to enter diagnostic data into data file 46 that is indicative of the above-described "run-time" and the above-described "accumulated-time" prior to any shutdown operation. The diagnostic data concerning "accumulated-time" may be retrieved from data file 46 during the next start-up procedure and used as the basis for future "accumulated-time" calculations.

While data file 46 is shown in FIG. 2 as being sequential in nature, this is for illustrative purposes only and is not intended to be a limitation of this disclosure. For example and as discussed above, data file 46 may be a logical chronological log file. Accordingly, data file 46 need not be sequential in nature and need only be organized in a logical fashion that allows for the retrieval of the status-related data stored within data file 46 in a known and logical fashion.

While data file 46 is shown in FIG. 2 to include a time/date stamp, this is for illustrative purposes only and is not intended to be a limitation of this disclosure. For example, any kind of sequencing stamp may be utilized within data file 46, such as an internal clock cycle stamp or an absolute "accumulated time" stamp.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

A number of implementations have been described. Nevertheless, it will be understood that various modifications may be made. Accordingly, other implementations are within the scope of the following claims.

What is claimed is:

1. A chronological data logging computer-implemented method comprising:
    detecting the availability of status-related data within a field replaceable unit (FRU) of a server storage system, wherein the status-related data pertains to whether the FRU is functioning properly, wherein the status-related data includes monitored environmental conditions external and internal to the FRU using sensors included within the FRU, including temperature, humidity, and abnormal input and output conditions with respect to the FRU;
    generating, by the FRU, the status-related data at a varying rate according to a mode of operation of the FRU, wherein the status-related data is generated less frequently during a sleep mode than during normal operation of the FRU, wherein the FRU is configured to periodically wake from the sleep mode such that status-related data is generated more frequently than during the sleep mode, wherein the status-related data is generated more frequently during a heavy usage mode than during normal operation of the FRU;
    writing run-time data, accumulated time data, and the status-related data to persistent memory within the FRU, wherein the status-related data is stored within one of a database file and a flat file, wherein the status-related data includes an occurrence of a fault condition providing a cause for a fault of the FRU prior to replacement of the FRU; and
    suspending writing of additional status-related data to the one of the database file and the flat file within the FRU based upon, at least in part, writing the status-related data to the one of the database file and the flat file.

2. The chronological data logging computer-implemented method of claim 1 wherein the status-related data includes fault data that was generated due to the occurrence of the fault condition within the FRU.

3. The chronological data logging computer-implemented method of claim 1 wherein the status-related data includes diagnostic data that was generated due to diagnostic operations performed within the FRU.

4. The chronological data logging computer-implemented method of claim 1 wherein the status-related data includes housekeeping data that was generated due to housekeeping operations performed within the FRU.

5. The chronological data logging computer-implemented method of claim 1 wherein the status-related data includes one or more of: a time stamp and a date stamp.

6. The chronological data logging computer-implemented method of claim 1 wherein the persistent memory is chosen from the group consisting of EEPROMs, Flash ROMs, battery backed up volatile memory, and disk drives.

7. The chronological data logging computer-implemented method of claim 1 wherein the status-related data is stored as a logical chronological log file resident on the FRU.

8. A chronological data logging computer program product residing on a non-transitory computer readable medium having a plurality of instructions stored thereon that, when executed by a processor, cause the processor to perform operations comprising:
    detecting the availability of status-related data within a field replaceable unit (FRU) of a server storage system, wherein the status-related data pertains to whether the FRU is functioning properly, wherein the status-related data includes monitored environmental conditions external and internal to the FRU using sensors included within the FRU, including temperature, humidity, and abnormal input and output conditions with respect to the FRU;
    generating, by the FRU, the status-related data at a varying rate according to a mode of operation of the FRU, wherein the status-related data is generated less frequently during a sleep mode than during normal operation of the FRU, wherein the FRU is configured to periodically wake from the sleep mode such that status-related data is generated more frequently than during the sleep mode, wherein the status-related data is generated more frequently during a heavy usage mode than during normal operation of the FRU;
    storing run-time data, accumulated time data, and the status-related data to persistent memory within the FRU, wherein the status-related data is one of stored within a database file, stored within a flat file, and stored as a logical chronological file, wherein the status-related data includes an occurrence of a fault condition providing a cause for a fault of the FRU prior to replacement of the FRU; and
    suspending writing of additional status-related data to the one of the database file and the flat file within the FRU based upon, at least in part, writing the status-related data to the one of the database file and the flat file.

9. The chronological data logging computer program product of claim 8 wherein the status-related data includes fault data that was generated due to the occurrence of the fault condition within the FRU.

10. The chronological data logging computer program product of claim 8 wherein the status-related data includes diagnostic data that was generated due to diagnostic operations performed within the FRU.

11. The chronological data logging computer program product of claim 8 wherein the status-related data includes housekeeping data that was generated due to housekeeping operations performed within the FRU.

12. The chronological data logging computer program product of claim 8 wherein the status-related data includes one or more of: a time stamp and a date stamp.

13. The chronological data logging computer program product of claim 8 wherein the persistent memory is chosen from the group consisting of EEPROMs, Flash ROMs, battery backed up volatile memory, and disk drives.

14. The chronological data logging computer program product of claim 8 wherein the status-related data is stored as a logical chronological log file resident on the FRU.

15. A chronological data logging computing system comprising:
   at least one processor;
   at least one memory architecture coupled with the at least one processor;
   a first software module executed on the at least one processor and the at least one memory architecture, wherein the first software module is configured to perform operations including detecting the availability of status-related data within a field replaceable unit (FRU) of a server storage system, wherein the status-related data pertains to whether the FRU is functioning properly, wherein the status-related data includes monitored environmental conditions external and internal to the FRU using sensors included within the FRU, including temperature, humidity, and abnormal input and output conditions with respect to the FRU;
   a second software module executed on the at least one processor and the at least one memory architecture, wherein the second software module is configured to perform operations including generating, by the FRU, the status-related data at a varying rate according to a mode of operation of the FRU, wherein the status-related data is generated less frequently during a sleep mode than during normal operation of the FRU, wherein the FRU is configured to periodically wake from the sleep mode such that status-related data is generated more frequently than during the sleep mode, wherein the status-related data is generated more frequently during a heavy usage mode than during normal operation of the FRU;
   a third software module executed on the at least one processor and the at least one memory architecture, wherein the third software module is configured to perform operations including storing run-time data, accumulated time data, and the status-related data to persistent memory within the FRU, wherein the status-related data is one of stored within a database file, stored within a flat file, and stored as a logical chronological file, wherein the status-related data includes an occurrence of a fault condition providing a cause for a fault of the FRU prior to replacement of the FRU, and wherein the third software module is further configured to suspend writing of additional status-related data to the one of the database file and the flat file within the FRU based upon, at least in part, writing the status-related data to the one of the database file and the flat file.

16. The chronological data logging computing system of claim 15 wherein the status-related data includes fault data that was generated due to the occurrence of the fault condition within the FRU.

17. The chronological data logging computing system of claim 15 wherein the status-related data includes diagnostic data that was generated due to diagnostic operations performed within the FRU.

18. The chronological data logging computing system of claim 15 wherein the status-related data includes housekeeping data that was generated due to housekeeping operations performed within the FRU.

19. The chronological data logging computing system of claim 15 wherein the status-related data includes one or more of: a time stamp and a date stamp.

20. The chronological data logging computing system of claim 15 wherein the persistent memory is chosen from the group consisting of EEPROMs, Flash ROMs, battery backed up volatile memory, and disk drives.

21. The chronological data logging computing system of claim 15 wherein the status-related data is stored as a logical chronological log file resident on the FRU.

22. The chronological data logging computer-implemented method of claim 3 wherein the diagnostic data includes monitored diagnostic data via differential pressure sensors and current sensors included within the FRU.

23. The chronological data logging computer program product of claim 10 wherein the diagnostic data includes monitored diagnostic data via differential pressure sensors and current sensors included within the FRU.

24. The chronological data logging computing system of claim 17 wherein the diagnostic data includes monitored diagnostic data via differential pressure sensors and current sensors included within the FRU.

\* \* \* \* \*